April 14, 1970   TAKEO SEKI   3,506,328
LIGHT DEFLECTION DEVICE
Filed Nov. 17, 1967
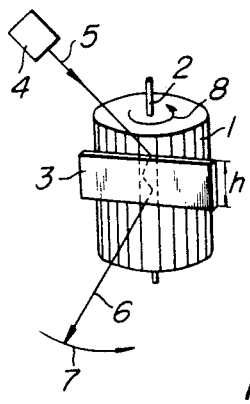
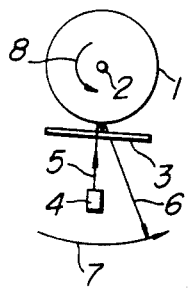
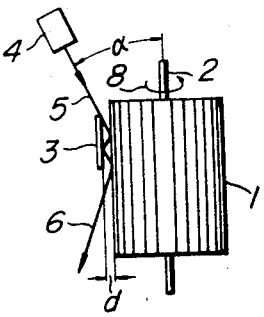
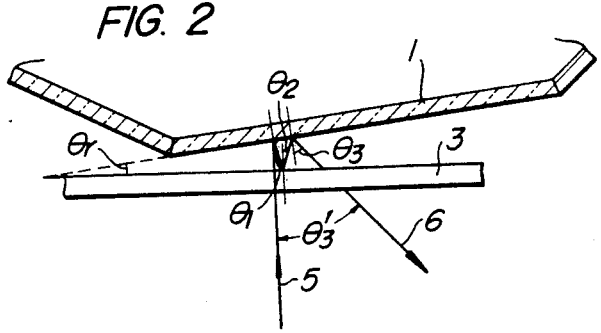
INVENTOR:
TAKEO SEKI
BY: Craig & Antonelli
ATTORNEYS United States Patent Office 3,506,328
Patented Apr. 14, 1970

3,506,328
LIGHT DEFLECTION DEVICE
Takeo Seki, Kokubunji-shi, Japan, assignor to Hitachi, Ltd., Tokyo, Japan, a corporation of Japan
Filed Nov. 17, 1967, Ser. No. 683,884
Claims priority, application Japan, Dec. 26, 1966, 41/76,885
Int. Cl. G02b 17/00
U.S. Cl. 350—7
2 Claims

ABSTRACT OF THE DISCLOSURE

A rotatable prismatic reflecting mirror assembled with a plurality of plane reflecting mirrors is opposingly provided to a fixed plane reflecting mirror. A light beam to be reflected is introduced between the fixed plane reflecting mirror and one of the plane reflecting mirrors of the rotatable prismatic reflecting mirror opposite to the fixed mirror so as to be reflected at least twice by the one of the rotating plane reflecting mirrors and at least once by the fixed plane reflecting mirror for deflection thereof.

This invention relates to a device to deflect light.

Recently, with the development of LASER (Light Amplification by Stimulated Emission of Radiation), the application and further developments of that light become fashionable. For example, the applications include laser television pick-up, laser television reception, a laser facsimile, a laser radar etc.

Now, what is most desired at present in such developments includes a method of controlling the deflection of light.

It was considered that a method to deflect light with a vibrating or rotating mirror was inapplicable in case of a high-speed deflection, but with the advent of laser light which is a well collimated, very fine, good directional and intense beam of light, quite a small mirror becomes usable and said method has become practical.

Conventional methods to deflect light with a reflecting mirror make use of a single reflection by a rotating or vibrating regular prismatic or plane reflecting mirror to deflect light. In other words, the law of reflection that "light incident on a reflecting mirror with an angle $\theta$ is reflected with the same angle $\theta$" is utilized and the angle of incidence $\theta$ and accordingly the angle of reflection $\theta$ is changed by rotating or vibrating a regular prismatic or plane reflecting mirror while keeping the direction of the incident light fixed and thus the reflected light is deflected. In this method, however, if the deflection angle and the deflection angular velocity of light are to be increased, the speed of rotation or vibration and the angle of the reflecting mirror should be increased and accordingly the reflecting mirror or the support member of the mirror and the bearings thereof may be damaged.

Therefore, an object of this invention is to provide a light deflection device with which the deflection angle and the deflection angular velocity of light can be increased without damaging a reflecting mirror or a support member of the reflecting mirror and its bearings.

In order to achieve said object, a rotatable regular prismatic reflecting mirror or a plane reflecting mirror capable of vibration and a fixed plane reflecting mirror are placed oppositely and light is introduced between the rotating regular prismatic or vibrating plane mirror and said fixed plane mirror. Light is then reflected by one of the reflecting surfaces of said regular prismatic mirror at least twice and by the reflecting surface of said fixed plane mirror at least once.

Other objects, features and advantages of the invention will become more apparent from the following detailed description of the invention when taken in conjunction with the accompanying drawings, wherein FIGS. 1a to 1c show an embodiment of the invention, wherein FIG. 1a is a perspective view, FIG. 1b is a plan view and FIG. 1c is a side view.

FIG. 2 is a fragmentary exploded diagram of the embodiment shown in FIG. 1b.

As shown in FIGS. 1a to 1c, a light deflection device according to the invention is composed, for example, of a rotatable regular prismatic reflecting mirror 1, a fixed plane reflecting mirror 3 placed in a way that the reflecting surface thereof becomes parallel to an axis of rotation 2 provided at the center of said regular prismatic reflecting mirror 1 and a light source 4 which lies in the plane including the axis of rotation 2 of said regular prismatic reflecting mirror 1 and perpendicular to said plane reflecting mirror 3. Light 5 from the light source 4 travels along the plane perpendicular to said plane reflecting mirror 3 towards said regular prismatic reflecting mirror 1 with an angle $\alpha$ somewhat inclined with respect to the axis of rotation as shown in FIGS. 1b and 1c. What is most important in this composition is to make said light 5 reflected by one of the reflecting surfaces of said regular prismatic mirror 1 at least twice and by the reflecting surface of said plane reflecting mirror 3 at least once by suitably selecting the height $h$ of said plane reflecting mirror 3, the angle $\alpha$ of the light 5 with respect to the axis of rotation 2 and the distance $d$ between the regular prismatic mirror 1 and the fixed plane reflecting mirror 3. The distance $d$ is so selected as to be substantially of the same order as the diameter of the incident light beam 5.

In the device according to the invention as composed in this way, the light 5 from the light source 4 is reflected between the regular prismatic mirror 1 and the plane mirror 3 a plurality of times and when the light ceases to hit the plane mirror 3 or the regular prismatic mirror 1 as shown in FIG. 1c, it leaves the device. The light 6 which has been reflected by the device is deflected in a direction shown by an arrow 7 in FIG. 1a or 1b since the regular prismatic mirror is rotating in the direction as shown by an arrow 8. The reason therefor will become apparent from the following description with reference to FIG. 2.

When the light traveling along the surface perpendicular to the plane mirror 3 with the angle $\alpha$ (light traveling from above towards the drawing in FIG. 2) is introduced between the regular prismatic reflecting mirror 1 and the plane reflecting mirror 3 and reflected by one of the reflecting planes of said regular prismatic mirror 1, the angle of reflection $\theta_1$ (the angle of reflection by a single reflection) becomes equal to the angle $\theta_r$ formed by the plane mirror 3 and said one reflecting surface of the regular prismatic mirror 1. The reflected light is again reflected by the reflecting surface of the plane mirror 3 and this time the angle of reflection $\theta_2$ becomes equal to $2\theta_r$. The light is further reflected by said one reflecting surface of the regular prismatic mirror 1 for the third time and the angle of reflection $\theta_3$ becomes $3\theta_r$ and an angle $\theta_3'$ formed with the light 5 becomes $4\theta_r$. If the angle of reflection at the N-th reflection is denoted by $\theta_N$, the angle $\theta_N$ becomes $N\theta_r$ and if an angle $\theta_N'$ with the light 5 is called the deflection angle, the deflection angle is $(N+1) \cdot \theta_r$ when N is odd number and $N\theta_r$ when N is even number. Accordingly, if the plane reflecting mirror 3 is fixed and the angle $\theta_r$ between the plane mirror 3 and the regular prismatic mirror 1 is changed by rotating the latter and further if the light 5 is made to be reflected a plurality of times between the regular prismatic mirror 1 and the plane mirror 3 so that $N>2$, then the deflection angle of light becomes an integer times the angle obtained with single reflection by conventional vibrating or rotating reflecting mirror and thus the deflection angle and the deflection angular velocity can be increased without increasing the speed of rotation or vibration of the reflecting mirror. It will easily be understood that the same argument holds true even when the light 5 is in a plane different from the plane perpendicular to the plane reflecting mirror 3.

In order to deflect light of 2 mm. in diameter, if the angle $\alpha$ relative to the axis of rotation 2 is 45°, the height $h$ of the plane reflecting mirror 3 must be at least 2.83 mm. and the distance $d$ between the regular prismatic reflecting mirror 1 and the fixed plane mirror 3 must be at least 1.42 mm. The length of the regular prismatic mirror 1 in a direction of the axis of rotation 2 must be at least 5.66 mm.

In such a device, light of 2 mm. in diameter is reflected twice by one reflecting surface of the rotating regular prismatic mirror 1 and once by the reflecting surface of the plane reflecting mirror 3. In this case, the range of maximum angle of deflection is determined by the number of the reflecting surfaces of the regular prismatic reflecting mirror 1. For example, the maximum angle is 240°, when the mirror is a regular hexagonal prism, 96° when the mirror is a regular pentadecagonal prism, about 68.6° when the mirror is a regular heneicosagonal (twenty-one sided) prism and 48° when the mirror is a regular triacontagonal (thirty sided) prism. As is evident from the foregoing description, the range of the deflection angle can be increased by increasing the number of reflections with a suitable selection of the angle $\alpha$ between the light and the axis of rotation, the height $h$ of the plane reflecting mirror and the distance $d$ between the regular prismatic reflecting mirror and the plane reflecting mirror. Further, it is evident that the deflection angular velocity changes with the number of the reflecting surfaces of the regular prismatic mirror and its speed of rotation.

This invention can be applied to various devices wherein scanning of light is required. For example, the invention is quite effective when applied to a deflection scanning device of laser light in a laser television set which projects images on a large screen by use of laser light and conventional television techniques.

Such a scanning device requires scanning lines of, for example, 819 in number, about 30 pictures per second, a large deflection etc. if the quality of the television picture is to be enhanced. Therefore, the horizontal deflection becomes quite difficult and can hardly be realized with conventional devices. However, if the present invention is applied, said operation can be realized easily with a reasonable mechanical structure. Namely, horizontal deflection can be realized if a rotatable regular prism having twenty one reflecting faces and a fixed plane reflecting mirror are placed as shown in FIGS. 1a to 1c and said regular prism is rotated with a speed of 70,200 revolutions per minute. In this case, it is evident that the laser light to be reflected is directed from above the plane mirror 3 towards the axis of rotation 2 in the arrangement of FIG. 1a as described hereinabove.

A larger number of reflections between the regular prismatic mirror and the plane mirror are preferable in principle, but on the other hand a smaller number of reflections are desirable for preventing the reflection loss of light. Further, since the scanning must be performed continuously, the number of reflections must be constant.

As has been described in detail hereinabove, the present invention makes use of the fact that the angle of reflection between two reflecting mirrors forming a certain angle increases with the number of reflection between said two mirrors and and that the angle of reflection is proportional to said angle formed by said two mirrors. Though the device according to the invention has a simple structure wherein a fixed plane mirror and a rotatable regular prismatic mirror or a mirror capable of high-speed vibration are placed oppositely, it has the remarkable effects from an industrial point of view that high-speed response is easy, deflection angle is large, etc.

What is claimed is:

1. A light deflecting device comprising:
    a fixed reflecting mirror with a plane reflecting surface;
    a rotatable regular prismatic reflecting mirror having a plurality of plane reflecting surfaces, said surfaces being positioned in an opposing relationship to the plane reflecting surface of the fixed mirror one after another during rotation of the rotatable mirror, the axis of rotation of the rotatable mirror being parallel with the plane reflecting surface of the fixed mirror;
    means for introducing a light beam between the plane reflecting surface of the fixed mirror and one such plane reflecting surface of the rotatable mirror which are mutually opposed to each other, said means for introducing a light beam located along a plane perpendicular to the plane of the fixed reflecting mirror so as to permit reflection of the light beam at least twice by the plane reflecting surface of the rotatable mirror and at least once by that of the fixed mirror.

2. The light deflecting device of claim 1, wherein the space between the reflecting surface of the fixed reflecting mirror and the opposing plane reflecting surface of the rotatable mirror is substantially of the same order as the diameter of the incident light beam.

References Cited

UNITED STATES PATENTS

| | | |
|---|---|---|
| 2,070,460 | 2/1937 | Traub. |
| 2,670,660 | 3/1954 | Miller _____ 350—285 |
| 3,029,685 | 4/1962 | Korneff et al. _____ 350—285 |

FOREIGN PATENTS 252,387   12/1926   Great Britain.

OTHER REFERENCES

G. L. Parkes, "Optical Amplifier," IBM Technical Disclosure Bulletin, vol. 4, No. 4, September 1961.

PAUL R. GILLIAM, Primary Examiner

U.S. Cl. X.R.

350—6, 178—7.6